United States Patent
Hsu

(10) Patent No.: US 6,688,614 B2
(45) Date of Patent: Feb. 10, 2004

(54) PORTABLE BAG/BOX HAVING A SLIDING FUNCTION

(76) Inventor: Yi-Chuan Hsu, No. 78, PO-Tang-HSIA, Yu-Hua Li, Miaoli City, Miaoli Hsien (TW)

( * ) Notice: Subject to any disclaimer, the term of this patent is extended or adjusted under 35 U.S.C. 154(b) by 176 days.

(21) Appl. No.: 09/942,644

(22) Filed: Aug. 31, 2001

(65) Prior Publication Data

US 2003/0042711 A1 Mar. 6, 2003

(51) Int. Cl.⁷ .............................................. B62K 15/00
(52) U.S. Cl. ..................... 280/37; 280/47.131; 280/47.2
(58) Field of Search ............................. 280/37, 38, 30, 280/47.19, 47.131, 47.371, 47.315, 47.26, 651, 655, 87.01, 87.041, 87.042, 87.05, 47.2; 190/18 A, 115; 180/208, 209

(56) References Cited

U.S. PATENT DOCUMENTS

| | | | | |
|---|---|---|---|---|
| 3,314,494 A | * | 4/1967 | Weitzner | 180/208 |
| 3,413,011 A | * | 11/1968 | Weitzner | 280/37 |
| 3,679,223 A | * | 7/1972 | Sakal | 280/37 |
| 6,460,866 B1 | * | 10/2002 | Altschul et al. | 280/30 |
| 6,478,315 B1 | * | 11/2002 | Manesis | 280/37 |
| 6,497,311 B2 | * | 12/2002 | Tiramani et al. | 190/18 A |

* cited by examiner

Primary Examiner—Brian L. Johnson
Assistant Examiner—Hau Phan
(74) Attorney, Agent, or Firm—Troxell Law Office PLLC

(57) ABSTRACT

A portable and slidable bag/box comprises an article holding body which is provided in the interior with a receiving space and in the lower portion with at least one wheel body to roll on the ground surface. A pull rod is disposed with the article holding body to serve as a hand grip. A slide board is provided in the rear with at least one rear wheel. The slide board is connected at the front with the article holding body by a connection mechanism which enables the slide board to be folded into the article holding body and to be unfolded under the article holding body. When the side board is folded into the article holding body, the article holding body is a portable bag/box, which can be pulled to slide by a user holding the pull rod. When the slide board is unfolded under the article holding body, the user holds the pull rod to steer the portable bag/box while riding on the slide board, with one foot pushing against the ground surface.

7 Claims, 22 Drawing Sheets

US 6,688,614 B2

PORTABLE BAG/BOX HAVING A SLIDING FUNCTION

FIELD OF THE INVENTION

The present invention relates generally to a portable box/bag, and more particularly to a portable box/bag having a sliding function.

BACKGROUND OF THE INVENTION

The portable box/bag, such as briefcase, shoulder bag, hand bag, etc., is carried by hand or shoulder, thereby resulting in fatigue of a person carrying the bag. It is rather troublesome to carry the bag on train, bus, etc., especially on the rainy days.

Certain luggages or book bags are provided at the bottom with rollers on which the luggages or bags move on a surface in conjunction with a pull rod which is held by hand to tilt the luggage or bag. The tilting of the box body has a downward component force, which results in a physical burden to a person carrying the box body for a long time, especially the heavy box body. The box body is moved in a step-by-step manner along with the carrier of the box body such that the moving distance of the box body remains constant in spite of an external force exerting thereon. It is therefore impossible to rush the box body to the destination in a short period of time.

There is a distance between the residence and the station of a public transportation facility. As a result, people resort to bicycle, motorcycle, car, etc to travel between the residence and the station, thereby resulting in the traffic jam as well as air pollution caused by fume of fossil fuels.

So far there is no hand bag or briefcase that is portable and can be used as a means of transportation or exercise.

SUMMARY OF THE INVENTION

It is the primary objective of the present invention to provide a portable box/bag, which can be used as a means of transportation for short distance.

It is another objective of the present invention to provide a portable box/bag which can be moved at a pace faster than the walking speed to arrive at the destination.

It is still another objective of the present invention to provide a portable box/bag capable of solving the parking problem of a user of transportation vehicle.

It is still another objective of the present invention to provide a portable box/bag, which can be carried with a minimum effort.

The box/bag of the present invention comprises an article placing body which is provided in the interior with a receiving space, and thereunder with at least a wheel body to roll on the ground surface. A pull rod is disposed with the article placing body for a person to hold. A slide board is provided in the rear with a rear wheel and is connected at the front end with the article placing body by a connection mechanism. The connection mechanism enables the slide board to be folded in the article placing body at the time when the slide board is in the connection state, and to be unfolded in the lower side of the article placing body. The slide board is folded in the article placing body to form a portable box/bag, which can be moved on a surface by a person holding the pull rod. The slide board is unfolded in the lower side of the article placing body to form a sliding board on which a person rides for a short distance, with the person holding the pull rod to steer the sliding board.

DETAILED DESCRIPTION OF THE INVENTION

Figure 1:
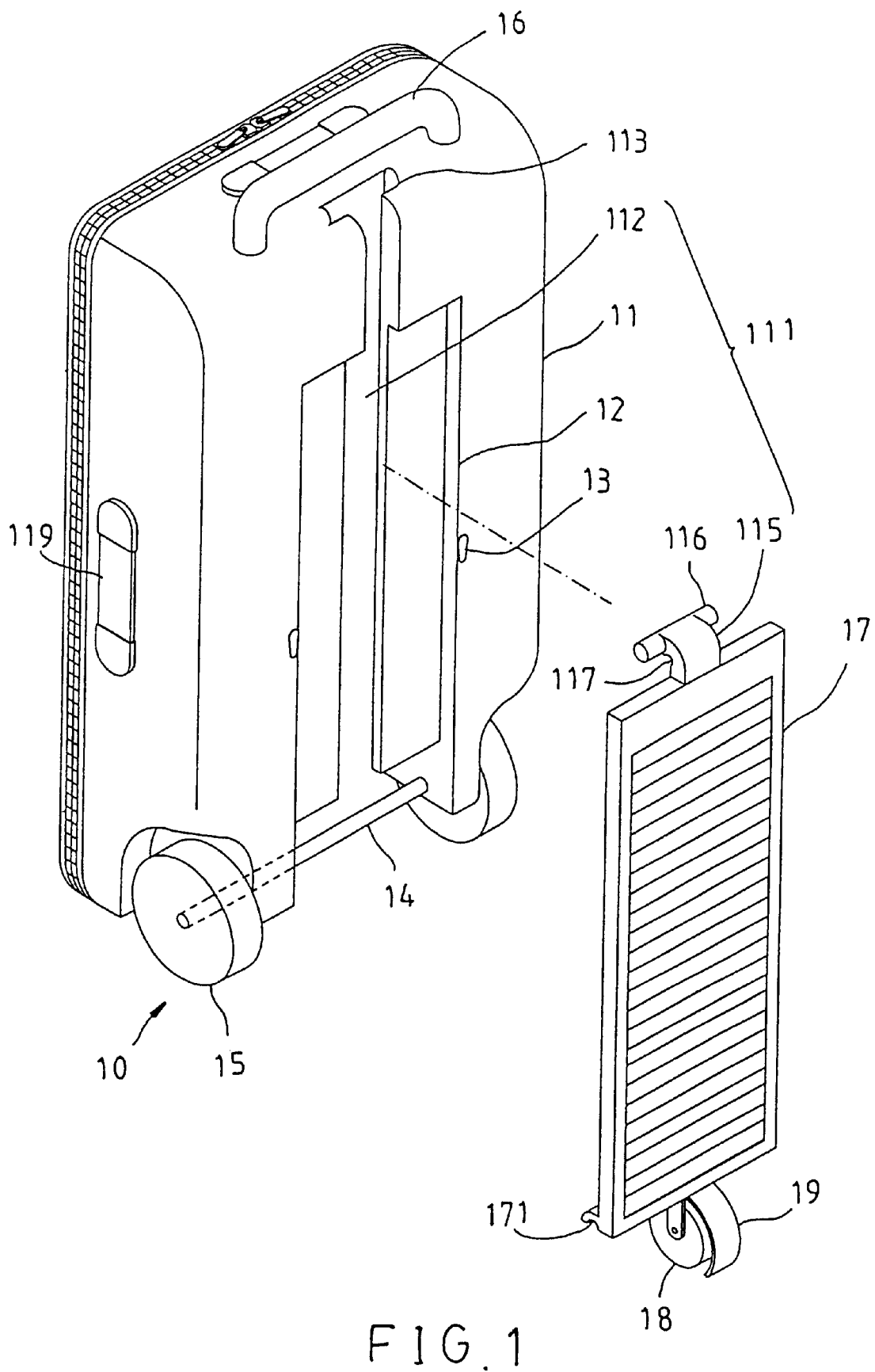
FIG. 1 shows an exploded view of a first preferred embodiment of the present invention.
Figure 2:
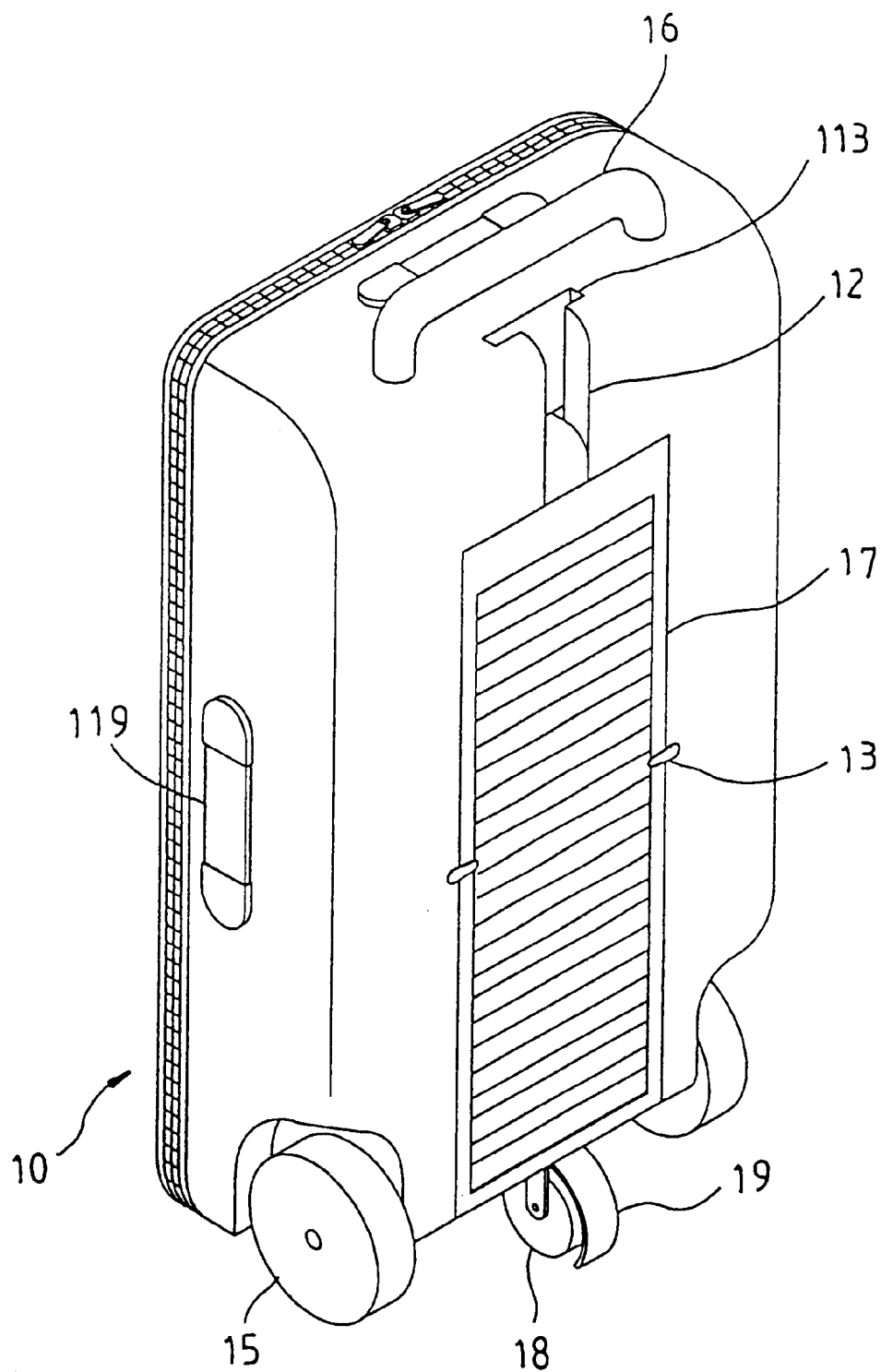
FIG. 2 shows a perspective view of the first preferred embodiment of the present invention in combination.

As shown in FIGS. 1 and 2, a portable box/bag 10 of the first preferred embodiment of the present invention comprises an article holding body 11, a pull rod 16, and a slide board 17.

The article holding body 11 has a hard shell and a box body having a receiving space and capable of being opened and closed. The body is provided in the rear end with a receiving slot 12 having an opening that faces outwards for receiving the slide board 17. A plurality of keeping members 13 of a piece body construction are pivoted at one end with the edge of the receiving slot 12 of the rear end of the article holding body 11 for stopping the slide board 17 at the time when the slide board 17 is folded, thereby enabling it to be attached to the rear end of the article holding body 11. A pivot 14 is disposed at the bottom of the article holding body 11 and is provided at both ends with a wheel body 15. The two wheel bodies 15 are located at the bottom of the article holding body 11 to roll on the ground surface. The article holding body 11 is a prior art structure.

The pull rod 16 of the first preferred embodiment is an expandable pull rod, which is disposed on the article holding body 11 and is a prior art structure.

The slide board 17 is provided at the rear end with a rear wheel 18 and a brake cover 19 corresponding in location to the rear wheel 18 for braking the rear wheel 18. The slide board 17 is connected at the top end with the article holding body 11 by a connection mechanism 111 which enables the slide board 17 to be folded in the article holding body 11 while in the connection state, and unfolded under the article holding body 11. The slide board 17 is provided in the rear end with a supporting portion 171 which supports the pivot 14 while the slide board 17 is folded.

The connection mechanism 111 of the preferred embodiment is formed of a rail 112 of the rear of the article holding body 11, and a guide block 115 of one end of the slide board 17. The rail 112 is uprightly disposed in the rear of the article holding body 11 and is provided in two sides of the interior thereof with an insertion slot 113 respectively. The guide block 115 is curved upwards and forward from the slide board 17 and is provided at the tail end with a protruded block 116 which is corresponding in shape to the rail 112 for inserting the rail 112 to slide up and down to make sure it does not escape. The neck of the guide block is provided with a recess 117 which catches the pivot 14 at the time when the guide block 116 is located at the bottommost portion of the rail 112.

Figure 3:
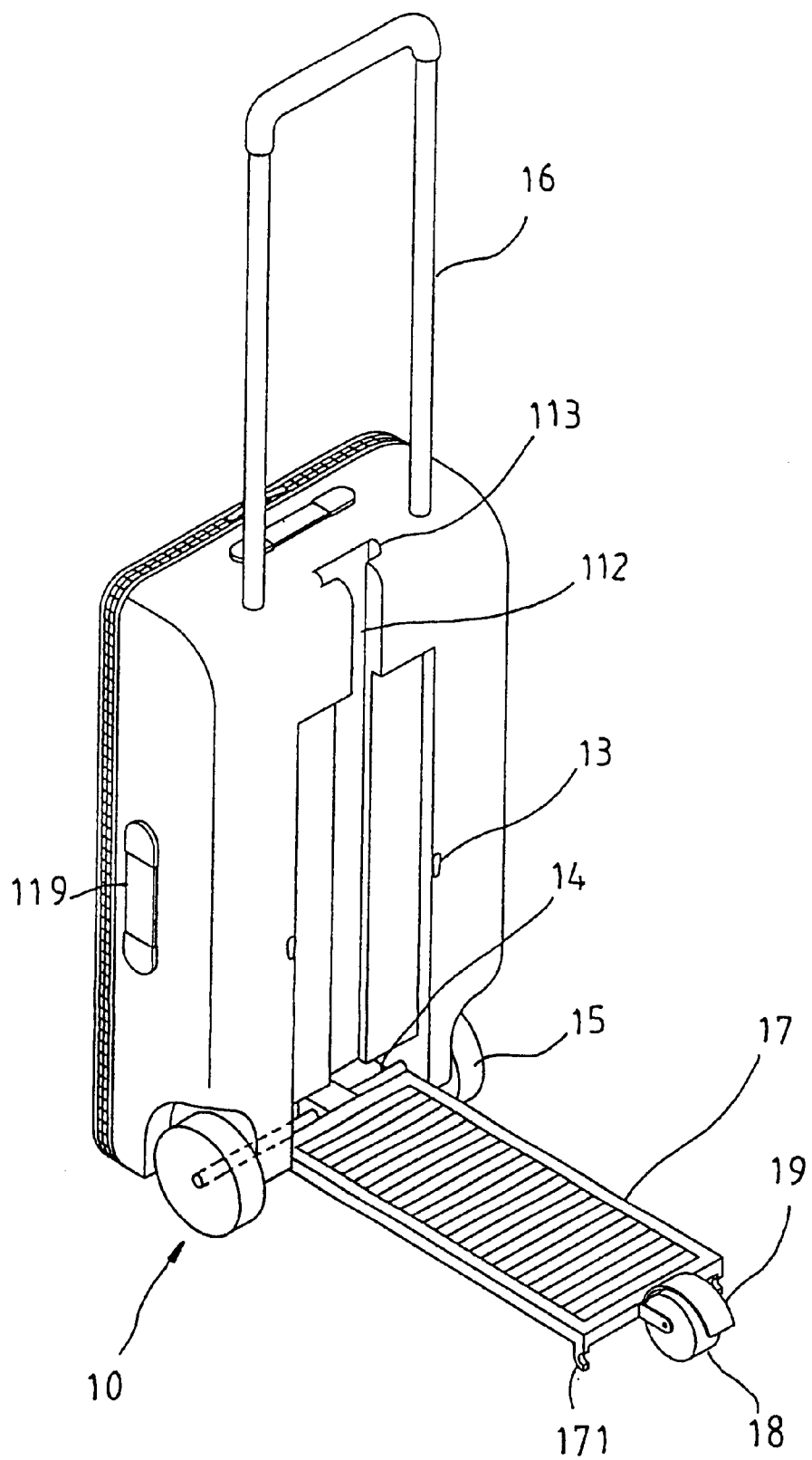
FIG. 3 shows a perspective view of the first preferred embodiment of the present invention in the unfolded state.
Figure 4:
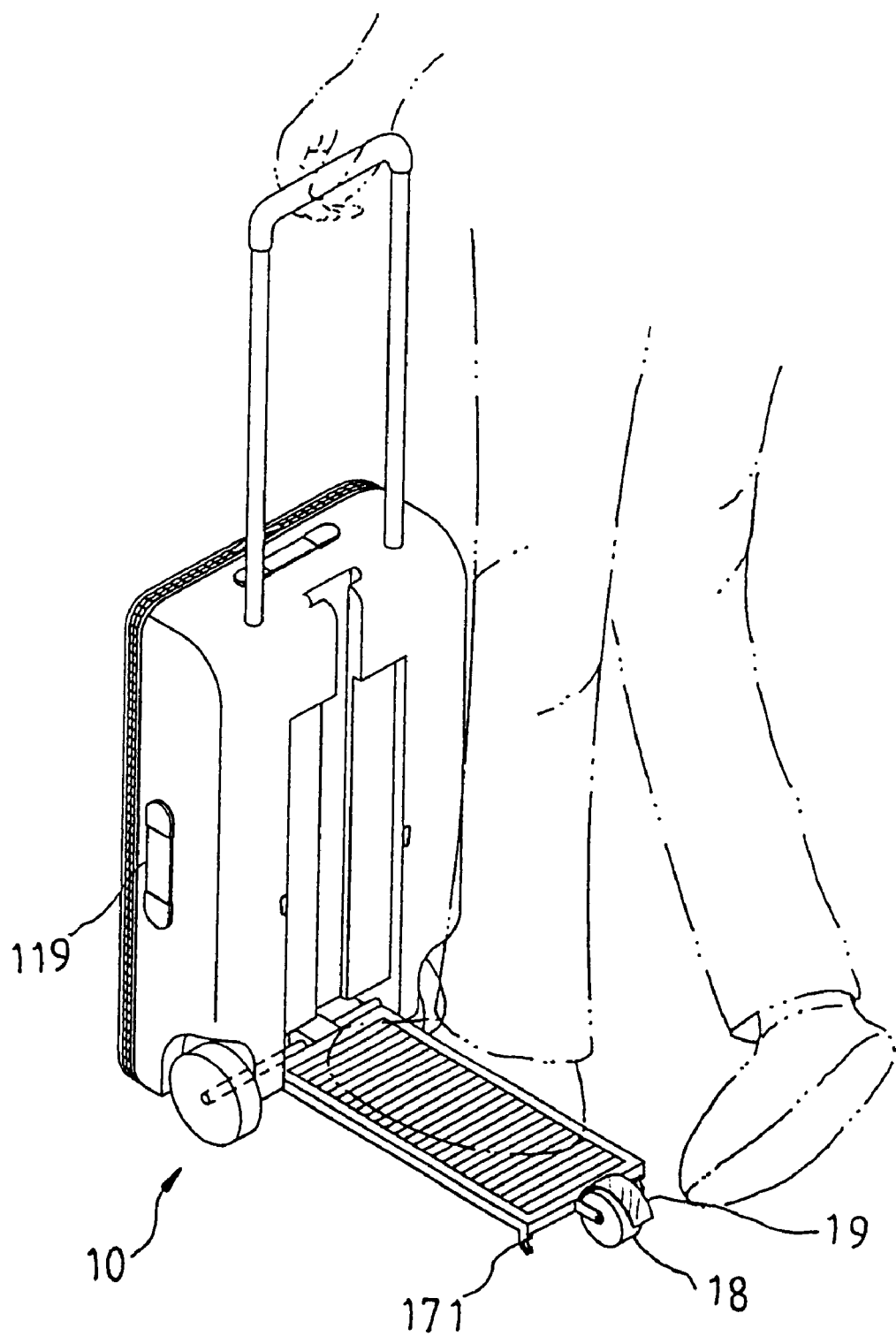
FIG. 4 shows a schematic view of the first preferred embodiment of the present invention in use.

As shown in FIG. 3, the bag/box 10 is in use. When the pull rod 16 and the slide board 17 are in the folded state, the slide board 17 is folded into the receiving slot 12. The rear wheel 18 and the wheel body 15 are located at the bottom of the article holding body 11. The user directly holds the handle 119 to lift the present invention 10 entirely to carry on. The user may pull out the pull rod 16 to pull the present invention on the wheel bodies 15. The present invention 10 is slid by pulling the pull rod 16 to extend out of the article holding body 11, and by pulling out the bottom of the slide board 17 such that the slide board 17 is pushed downward along the rail 112 so as to cause the protruded block 116 of the guide block 115 to slide downwards along the rail to catch the pivot 14. The pivot 14 serves as an application point of load weight. In the meantime, the two wheel bodies 15 and the rear wheel 18 roll on the ground surface. The user steps on the slide board 17 to steer with the pull rod 16, as illustrated in FIG. 4.

Figure 5:
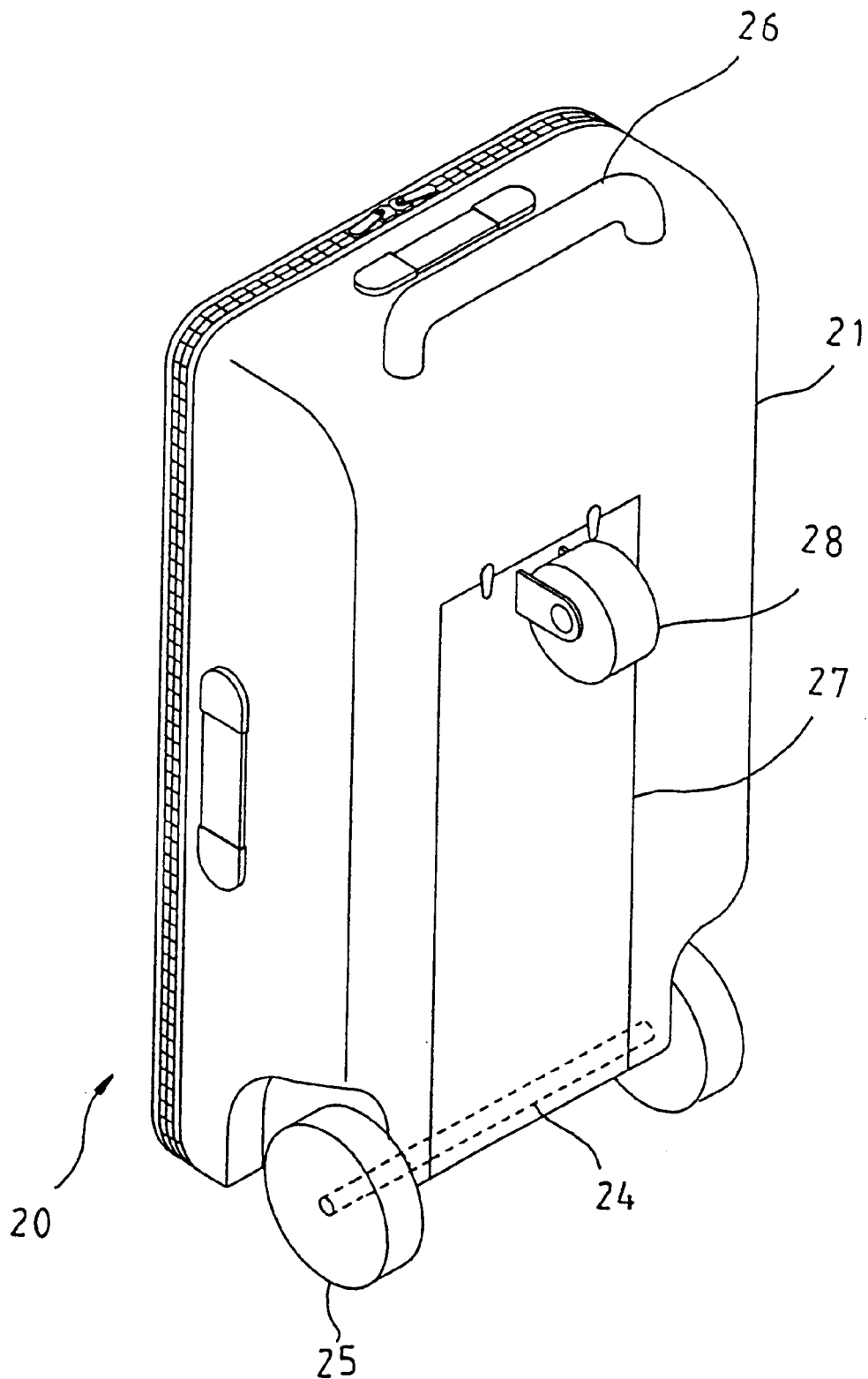
FIG. 5 shows a perspective view of a second preferred embodiment of the present invention in combination.

As shown in FIG. 5, a bag/box 20 of the second preferred embodiment is similar to that of the first preferred embodiment except that the former comprises a slide board 27 which is pivoted at the front end with the pivot 24 of the bottom of the article holding body 21 by a winding chain 211. The shaft of the winding chain 211 is the pivot 24. The two wheel bodies 25 are pivoted at both ends of the pivot 24. The slide board 27 swivels, folds, or unfolds along the pivot 24.

Figure 6:
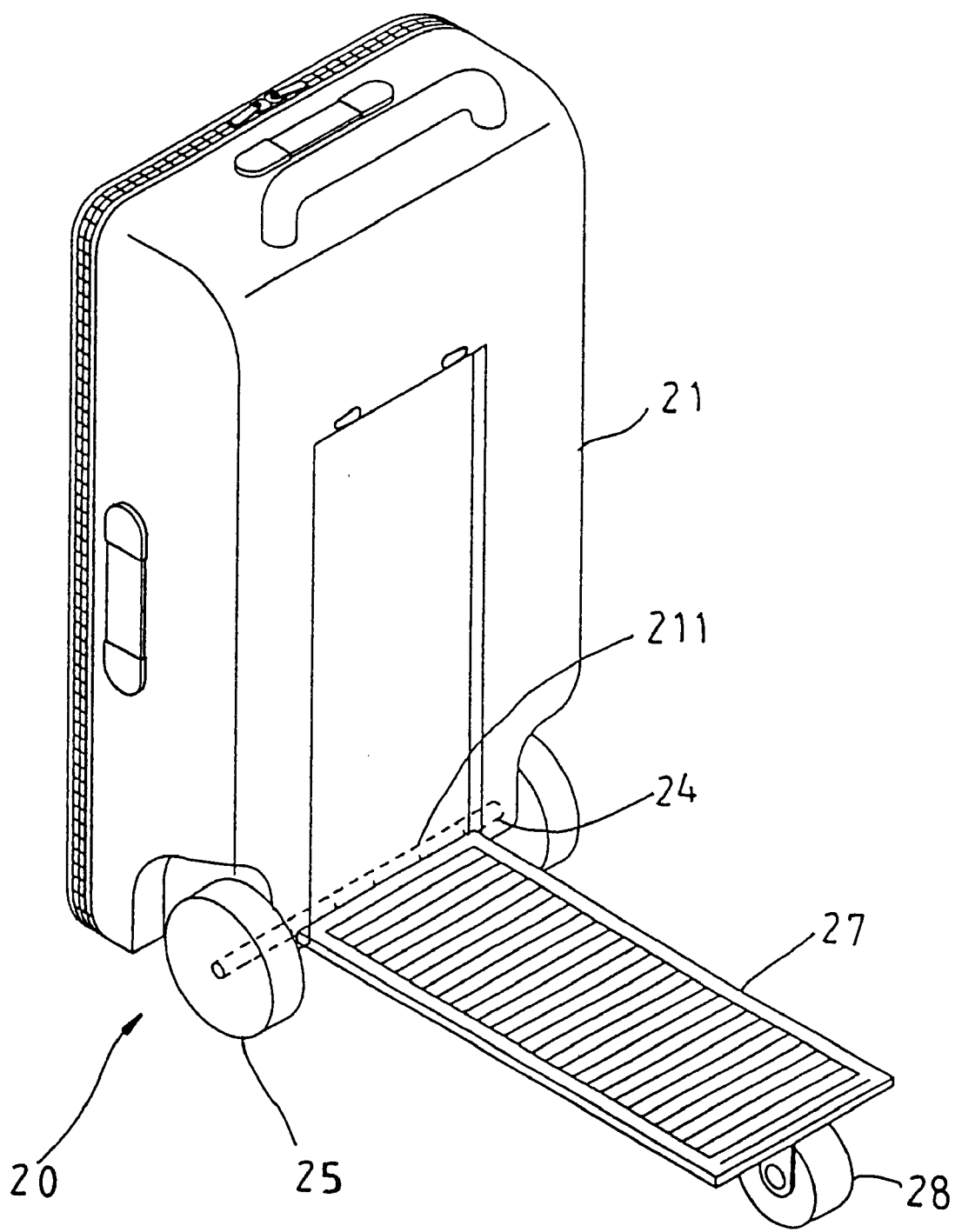
FIG. 6 shows a perspective view of the second preferred embodiment of the present invention in the unfolded state.

As shown in FIG. 6, when the bag/box 20 is in use, the slide board 27 is unfolded at the bottom of the article holding body 21. The rear wheel 28 of the slide board 27 is in contact with the ground surface. The user steps on the slide board 27 to cruise, with his or her hand holding the pull rod 26.

Figure 7:
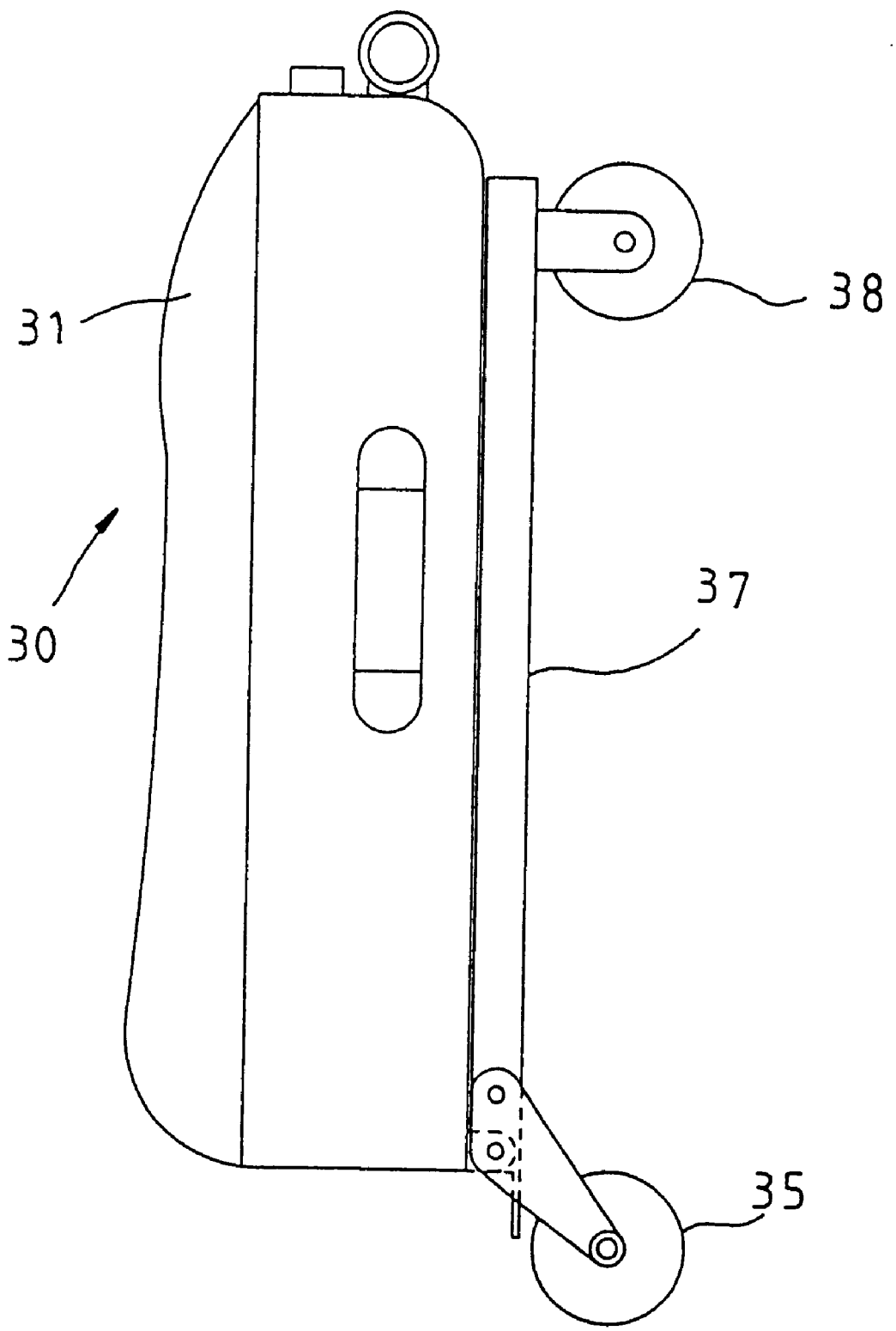
FIG. 7 shows a side view of a third preferred embodiment of the present invention.
Figure 8:
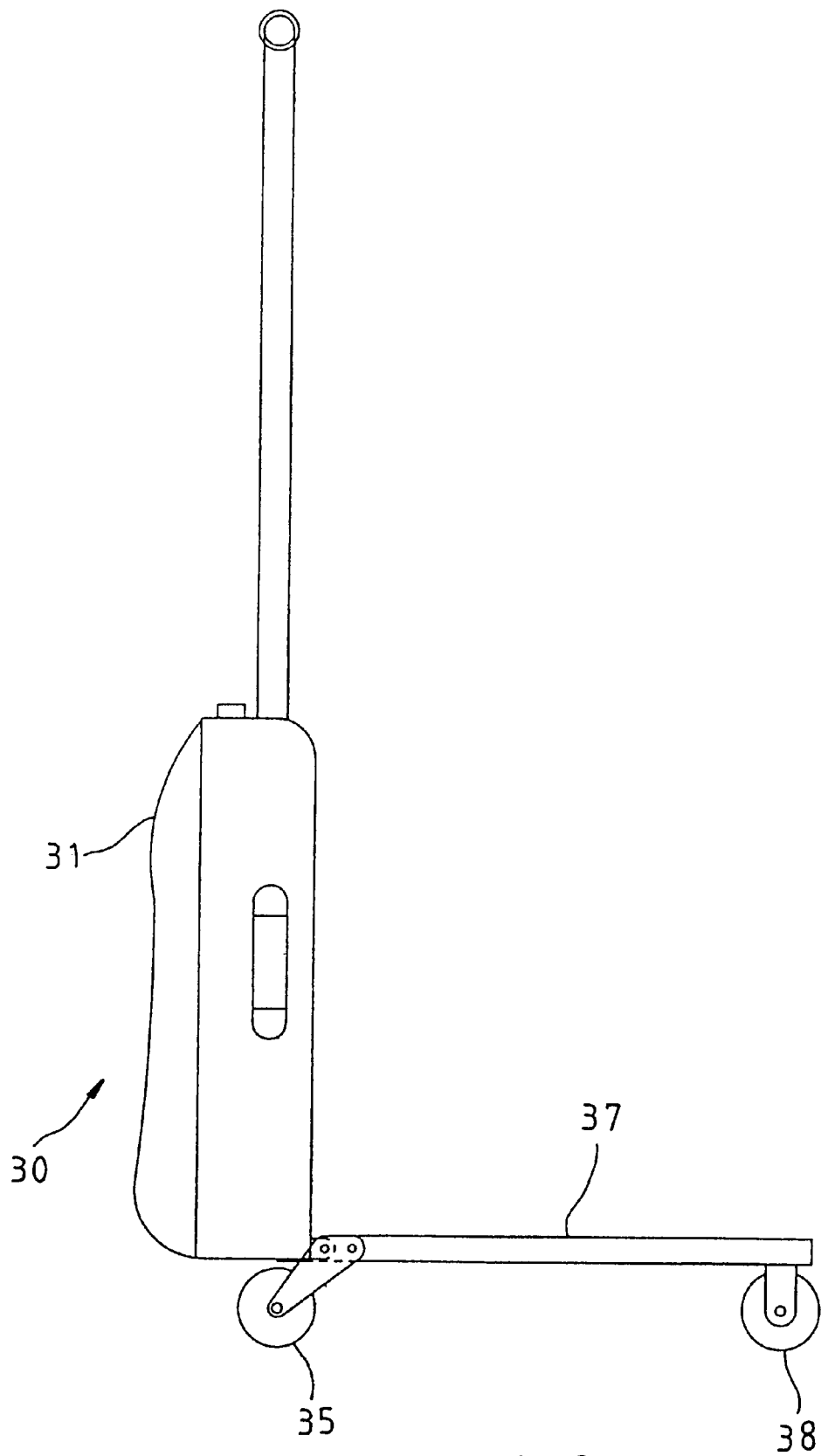
FIG. 8 shows a side view of the third preferred embodiment of the present invention in the unfolded state.

As shown in FIG. 7, a portable bag/box 30 of the third preferred embodiment is similar to the second preferred embodiment except that the former comprises two wheel bodies 35 which are disposed at the outer side of the bottom of the slide board 37, and the rear wheel 38 which is disposed in the outer side of the top of the slide board 37. In the folding process, the slide board 37 is folded to the rear end of the article holding body 31. In the unfolding process, the two wheel bodies 35 of the slide board 37 act as front wheels to slide on the ground surface along with the rear wheel 38, as shown in FIG. 8.

Figure 9:
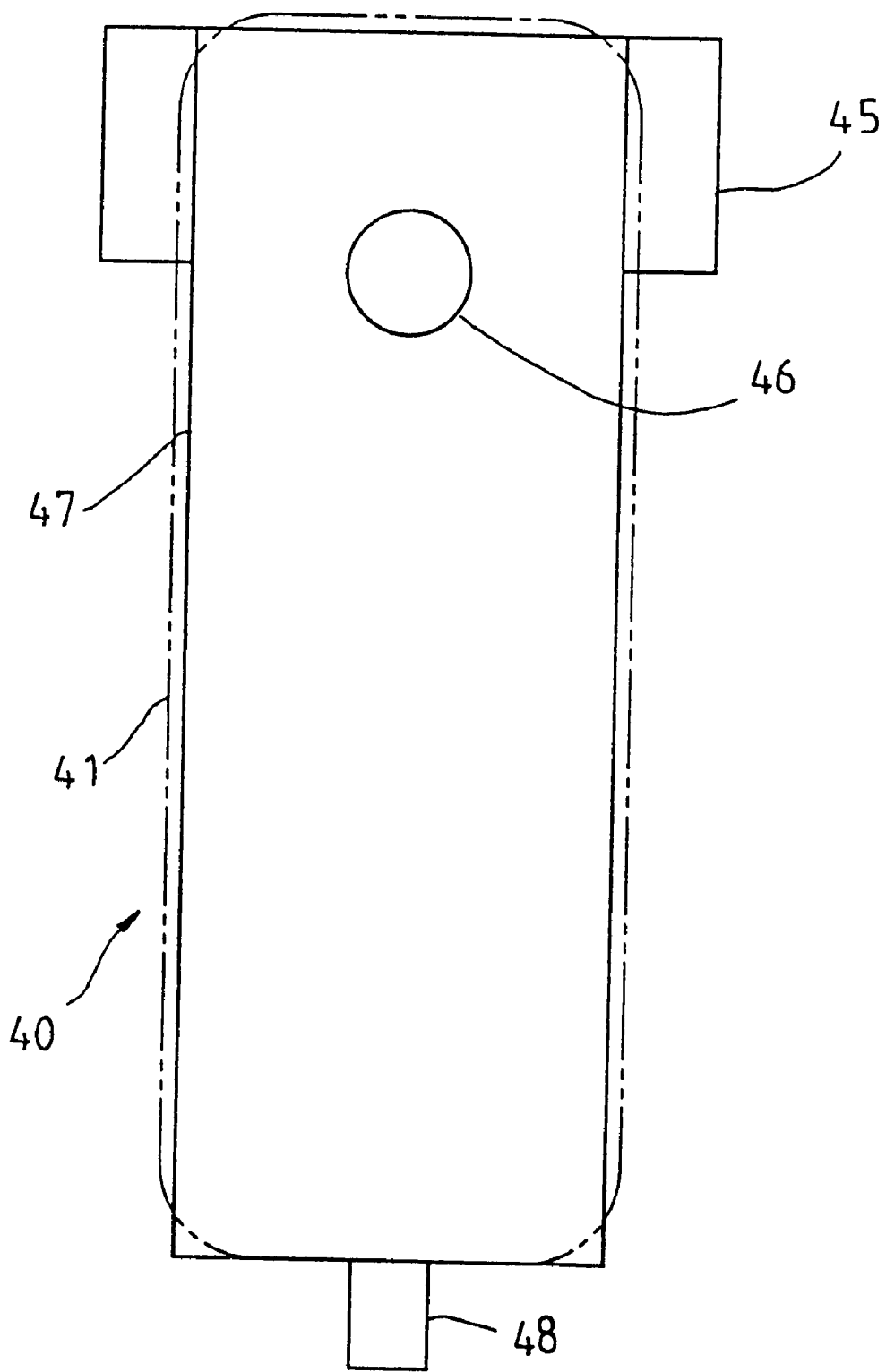
FIG. 9 shows a schematic view of a fourth preferred embodiment of the present invention in combination.
Figure 10:
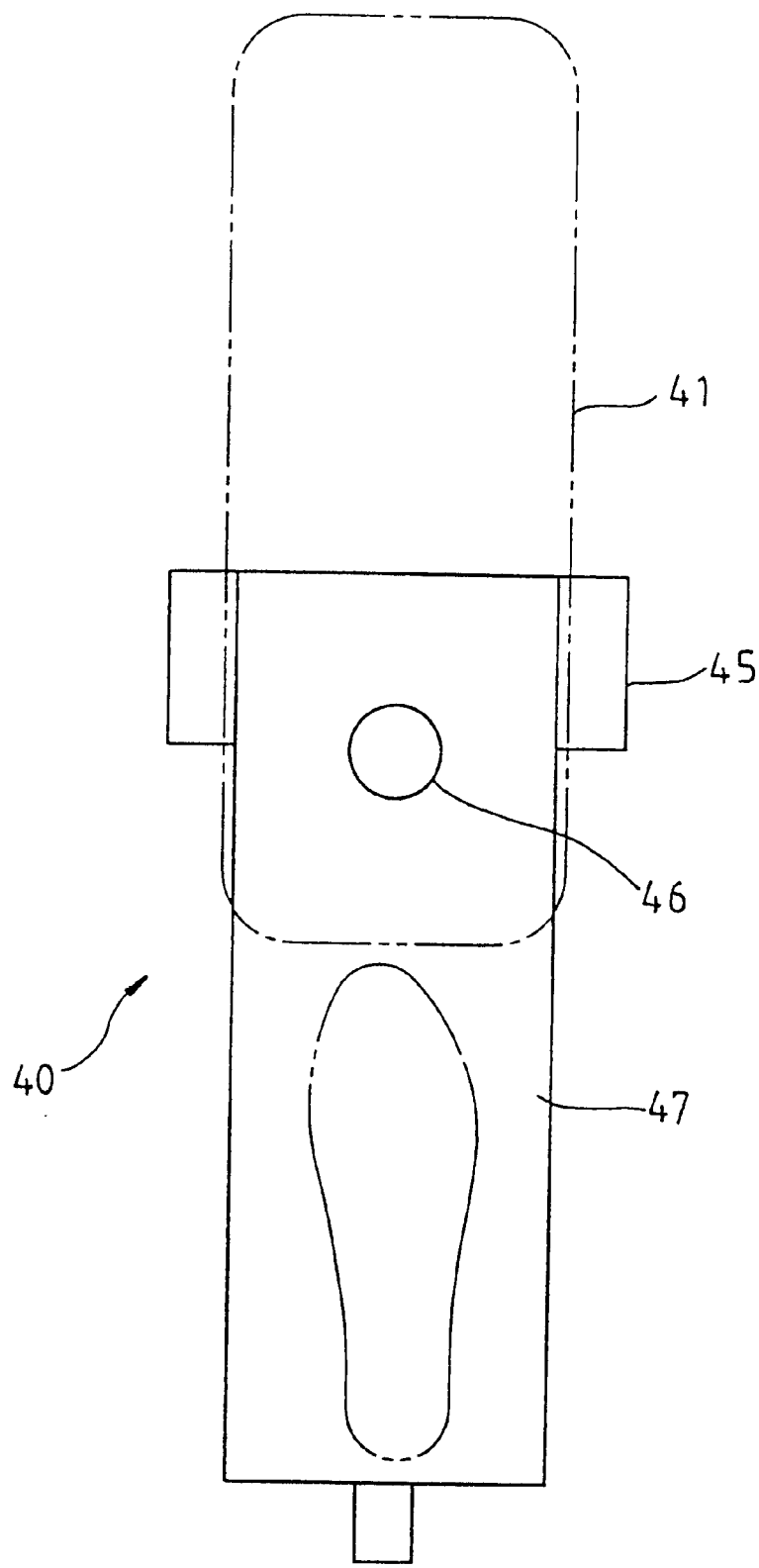
FIG. 10 shows a schematic view of the fourth preferred embodiment of the present invention in the unfolded state.
Figure 11:
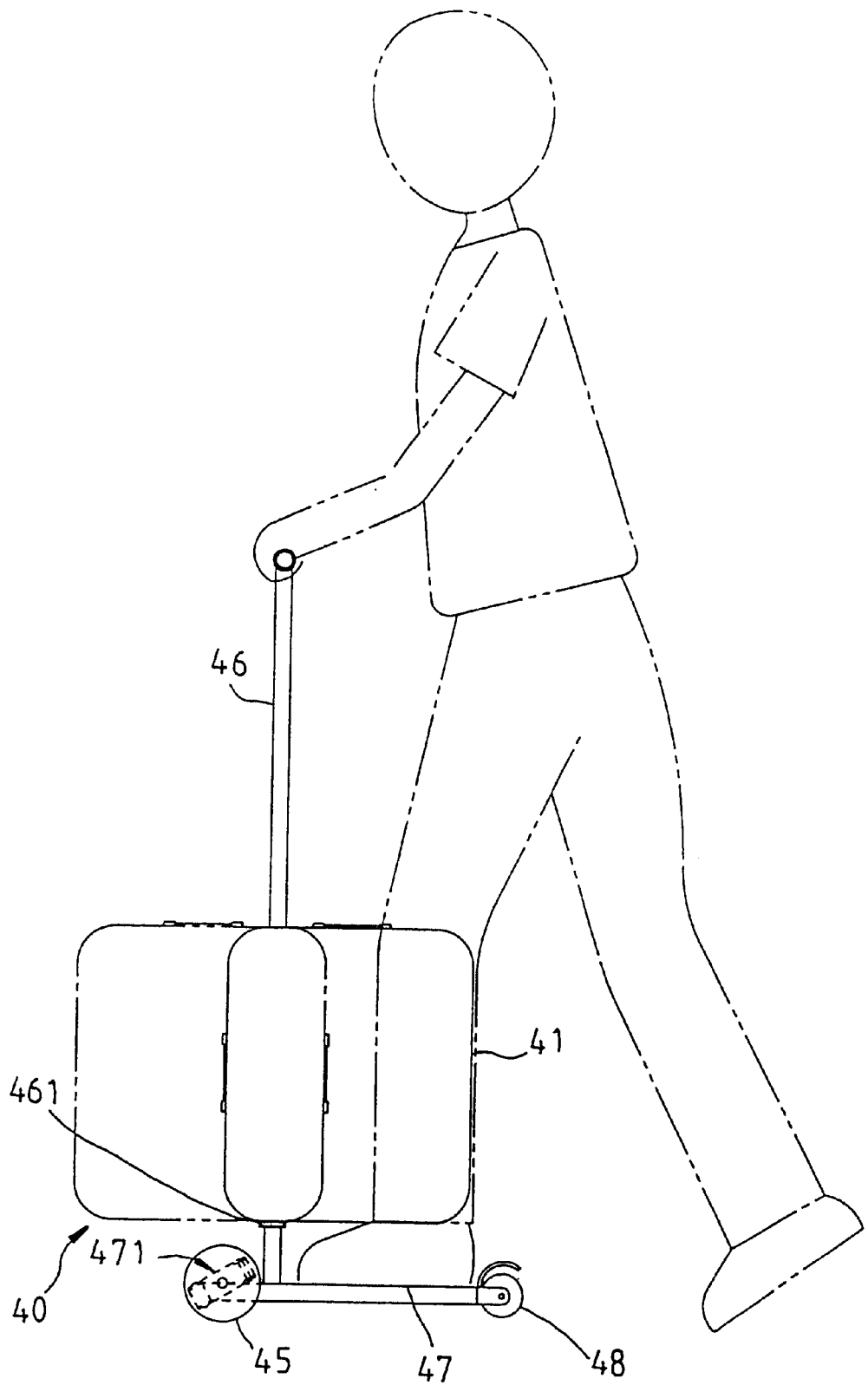
FIG. 11 shows a side view of the fourth preferred embodiment of the present invention in the unfolded state.

As shown in FIGS. 9–11, a portable bag/box 40 of the fourth preferred embodiment is similar to that of the third preferred embodiment except that the former comprises an article holding body 41, which is a bag body of a soft material. The bottom of the pull rod 46 is jutted out of the article holding body 41, as indicated by the dotted line in the drawing. The article holding body 41 turns on the pull rod 46 serving as a shaft. The pull rod 46 is provided with a support tray 461 corresponding to the bottom of the article holding body 41 for supporting the article holding body 41 to locate at the position of the pull rod 46. The slide board 47, as shown by the dotted line in the drawing, is fixed at the front segment with the bottom end of the pull rod 46 to locate under the article holding body 41. The wheel bodies 45 are disposed at one end of the slide board 47. The rear wheel 48 is disposed at other end of the slide board 47. The slide board 47 is provided at the front end with one set of parallel connection rods 471. The two wheel bodies 45 are disposed at both ends of the parallel connection rods 471. The pull rod 46 is operated to swivel leftwards and rightwards. In the meantime, the two wheel bodies 45 swivel along to bring about the steering effect. In short, the swiveling action of the pull rod 46 guides the course of motion of the two wheel bodies 45. The operating state of this embodiment is same as that of the third embodiment.

Figure 12:
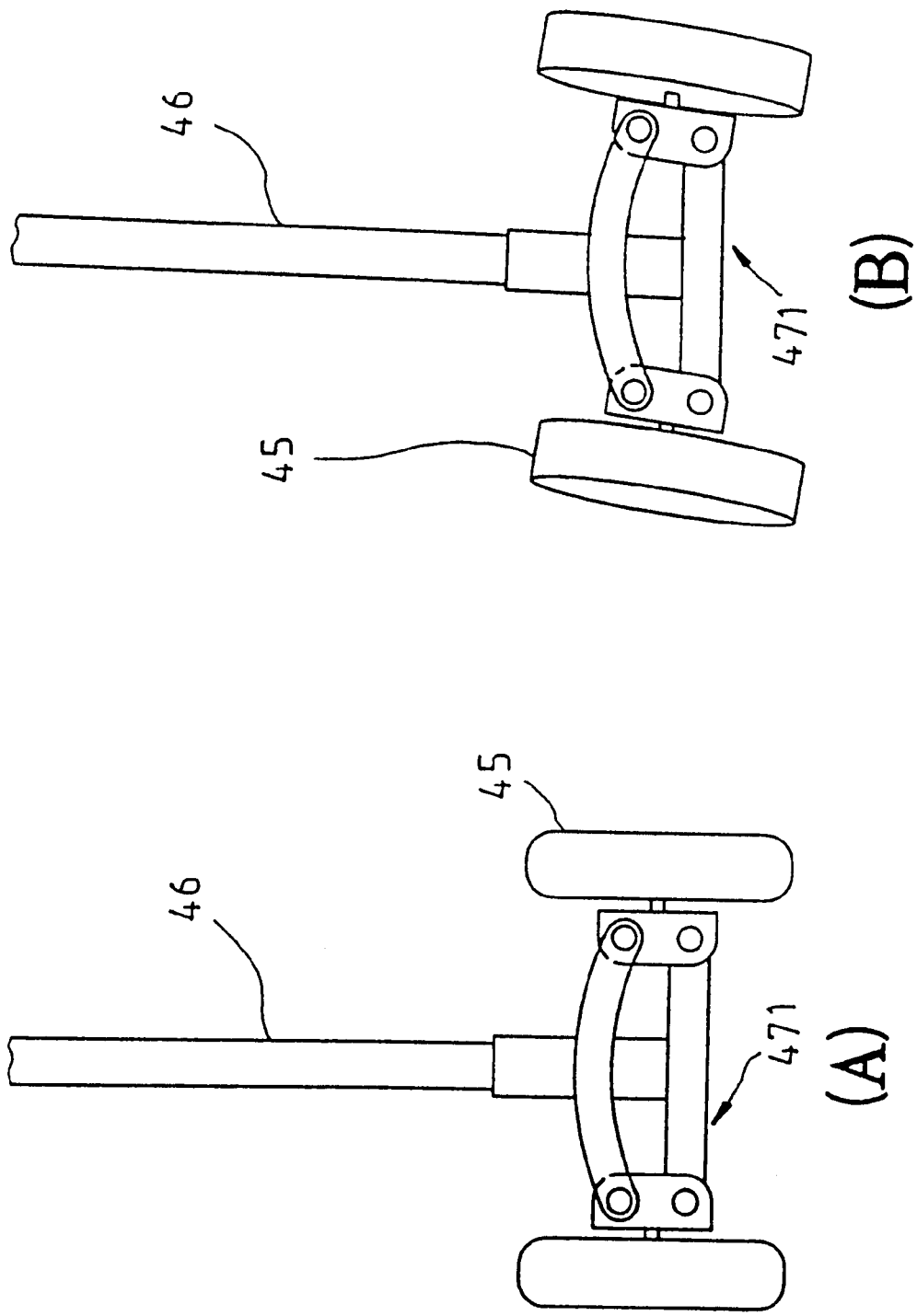
FIG. 12 shows a schematic view of the fourth preferred embodiment of the present invention in operation.

As shown in FIG. 9, when the embodiment is folded, the slide board 47 is located under the article holding body 41. As shown in FIG. 10, when it is unfolded, the article holding body 41 is turned 180 degrees along the pull rod 46 to enable the portion of the board body of the slide board 47 to be exposed to form a treading position. As shown in FIG. 11, the user can ride on the board. As shown in FIG. 12(A), when the pull rod 46 is in the upright state, the wheel bodies 45 are in the positive direction. As shown in FIG. 12(B), when the pull rod 46 is swiveled aside, the two wheel bodies 45 are linked to turn aside, thereby enabling the present invention in motion to bring about the steering action.

Figure 13:
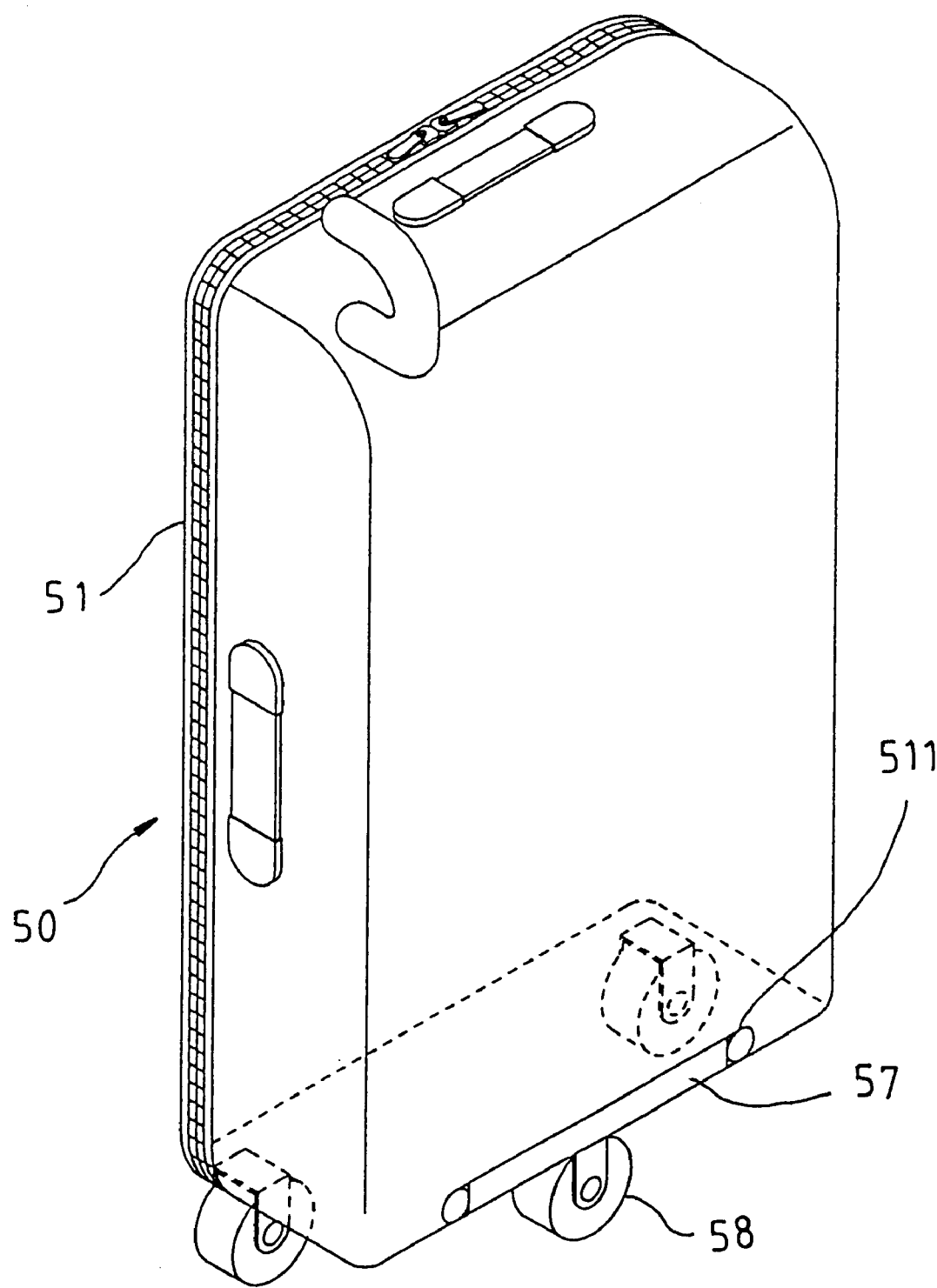
FIG. 13 shows a perspective view of a fifth preferred embodiment of the present invention.
Figure 14:
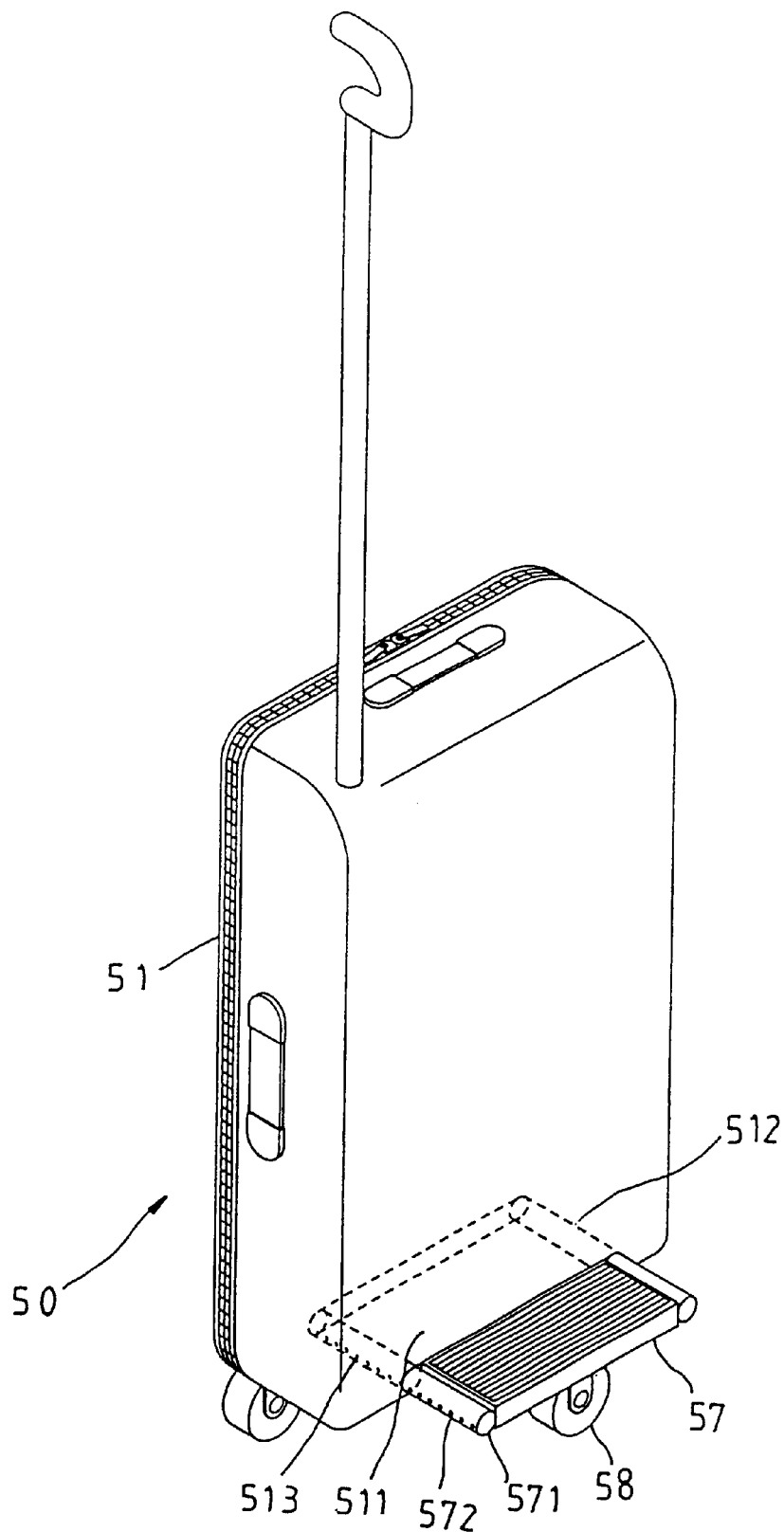
FIG. 14 shows a perspective view of the fifth preferred embodiment of the present invention in the unfolded state.
Figure 15:
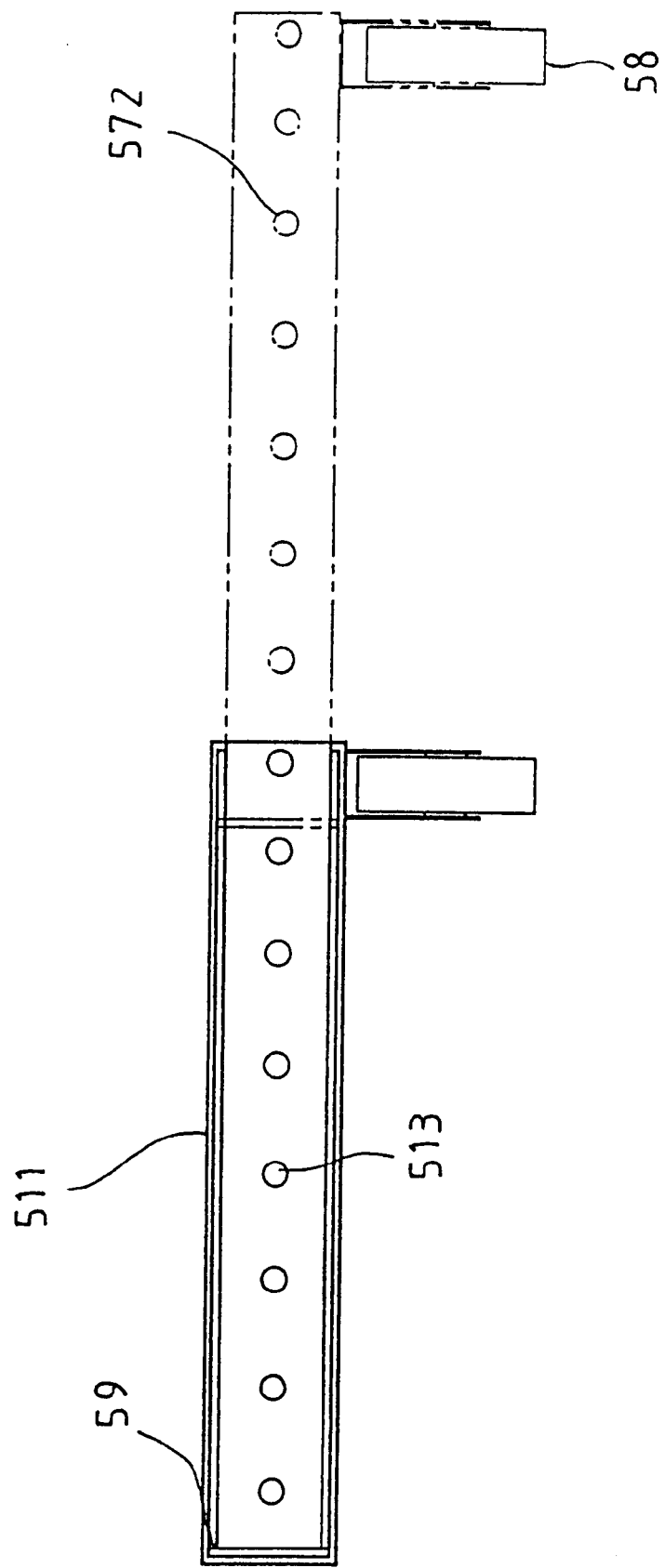
FIG. 15 shows a partial schematic view of the fifth preferred embodiment of the present invention, showing the relationship between the retaining point and the locating point.

As shown in FIGS. 13–15, a portable bag/box 50 of the fifth preferred embodiment of the present invention is similar to the first embodiment, except that the former comprises the article holding body 51 which is provided at the bottom with a receiving cell 511 having an opening facing outwards. The receiving cell 511 is provided in two sides of the inner wall with a guide slot 512 of a semicircular tube and having a plurality of locating points 513 arranged along the axial direction. The slide board 57 is provided at the rear end with a rear wheel 58 corresponding to the opening of the receiving cell 511, and in two sides of the front end with a side rail 571 of a tubular shape and having a plurality of retaining points 572 arranged along the axial direction to cooperate with the locating points 513 while sliding in the guide slot 512 of the receiving cell 511. The slide board 57 is provided at the front end with a horizontal stop edge 59. When the slide board 57 is pulled out of the receiving cell 511, the stop edge 59 presses against the inner side of the opening of the receiving cell 511 to prevent the slide board 57 from slipping out of the receiving cell 511.

Figure 16:
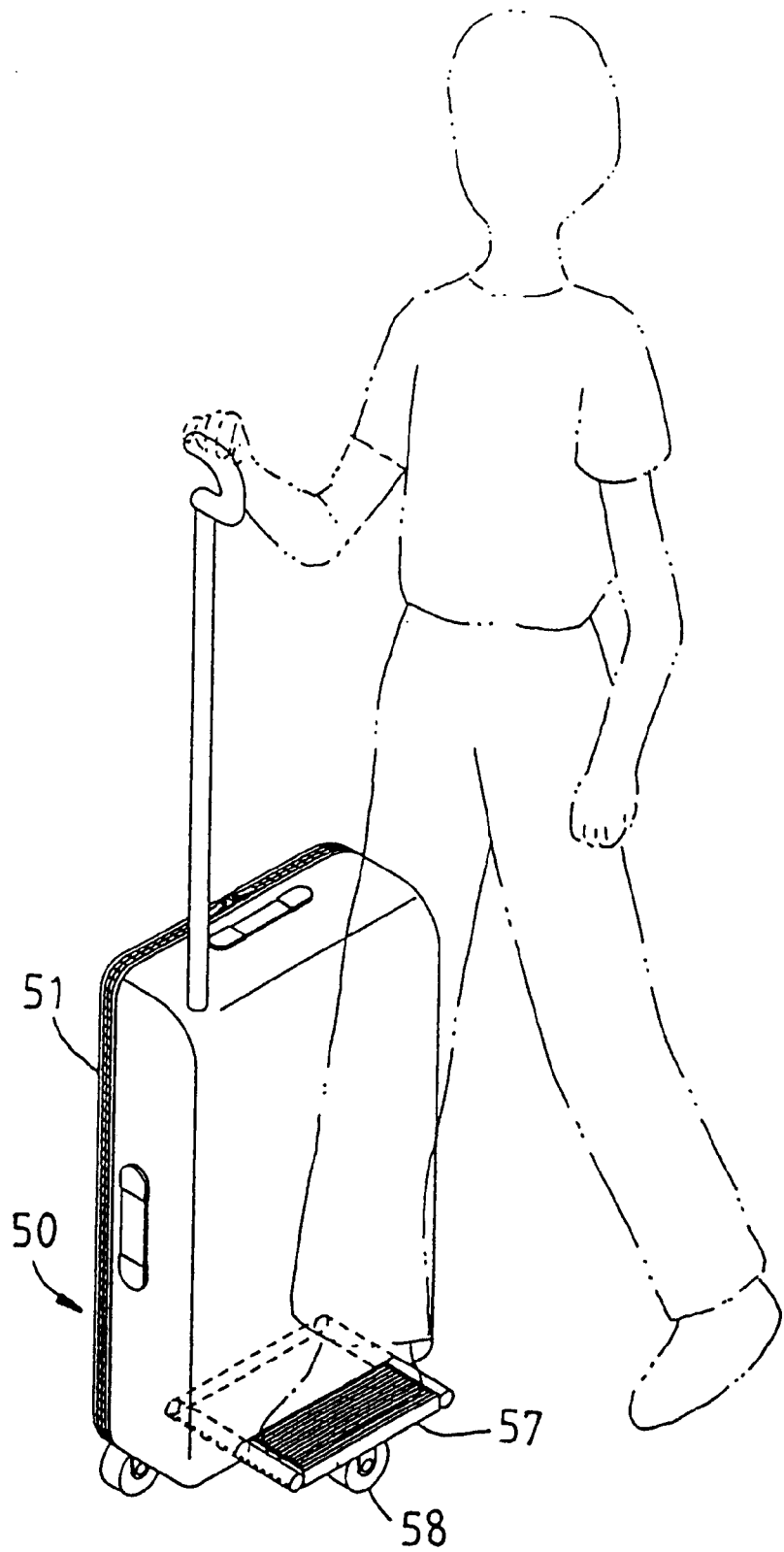
FIG. 16 shows a schematic view of the fifth preferred embodiment of the present invention in use.

As shown in FIG. 13, in the folding state, the slide board 57 is kept in the receiving cell 511. As shown in FIG. 14, in the unfolded state, the slide board 57 is pulled out of the receiving cell 511 and is located by means of the retaining points 572 and the locating points 513. As shown in FIG. 15, the stop edge 59 is stopped at the inner side of the opening of the receiving cell 511, thereby forming a tread platform to facilitate the riding by the user, as illustrated in FIG. 16.

Figure 17:
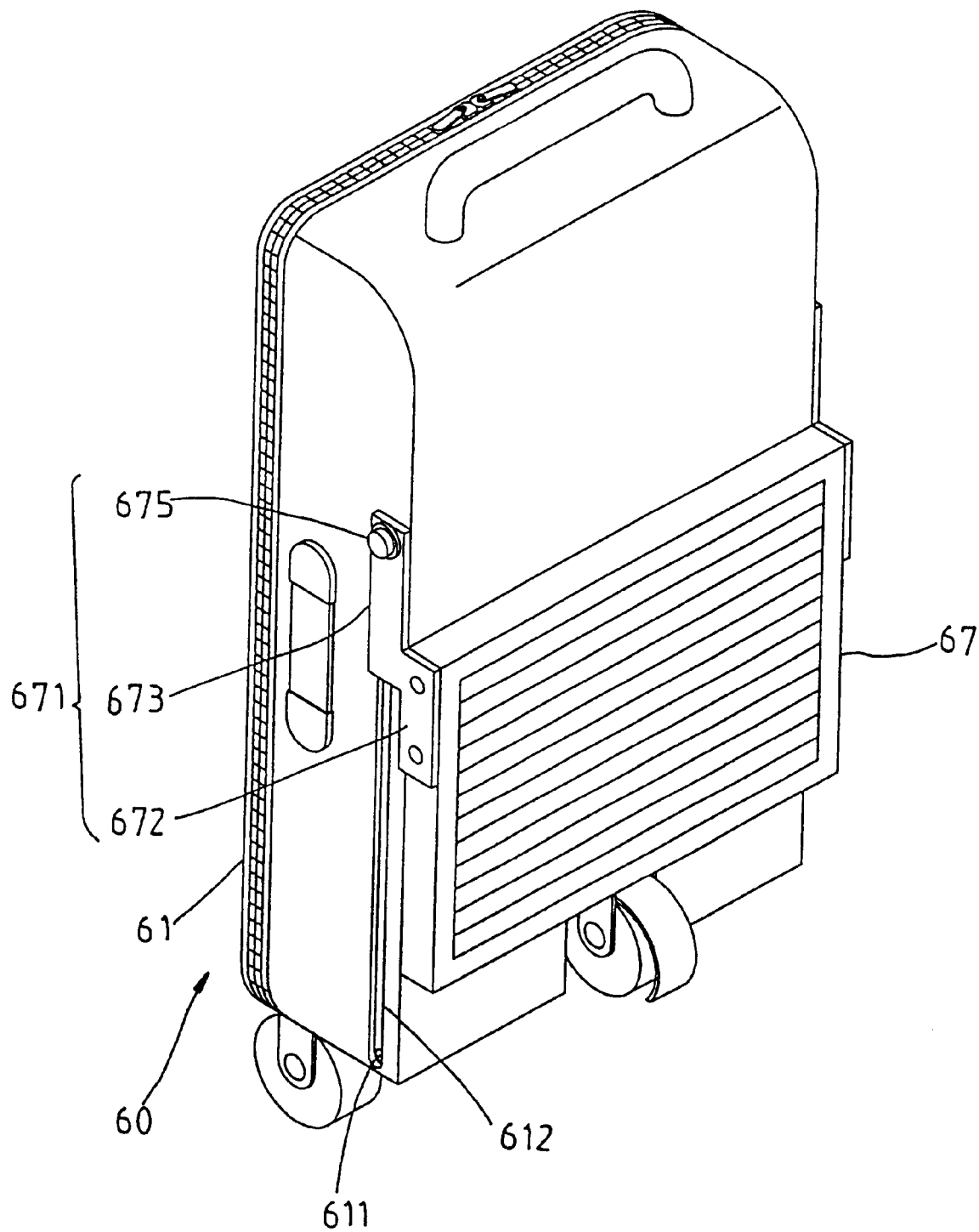
FIG. 17 shows a perspective view of a sixth preferred embodiment of the present invention.

As shown in FIG. 17, a portable bag/box 60 of the sixth embodiment of the present invention is similar to the first embodiment described above, except that the former comprises an article holding body 61 which is provided in the upper and the lower positions of two sides thereof with locating portions 611 opposite to each other and having a threaded hole. The article holding body 61 is provided in two sides with a guide slot 612. The slide board 67 is provided in two sides of the front end thereof with two connection portions 671 corresponding to each other. Each connection portion 671 is formed of a connection piece 672 and a fixation member 675. Each connection piece 672 is connected with one side of the front end of the slide board 67 and is provided at the tail end with a pivoting block 673, which is slidably disposed in the guide slot 612. The fixation member 675 is a bolt, which is disposed on the corresponding pivoting block 673 for connecting the corresponding location portion 611 (threaded hole).

Figure 18:
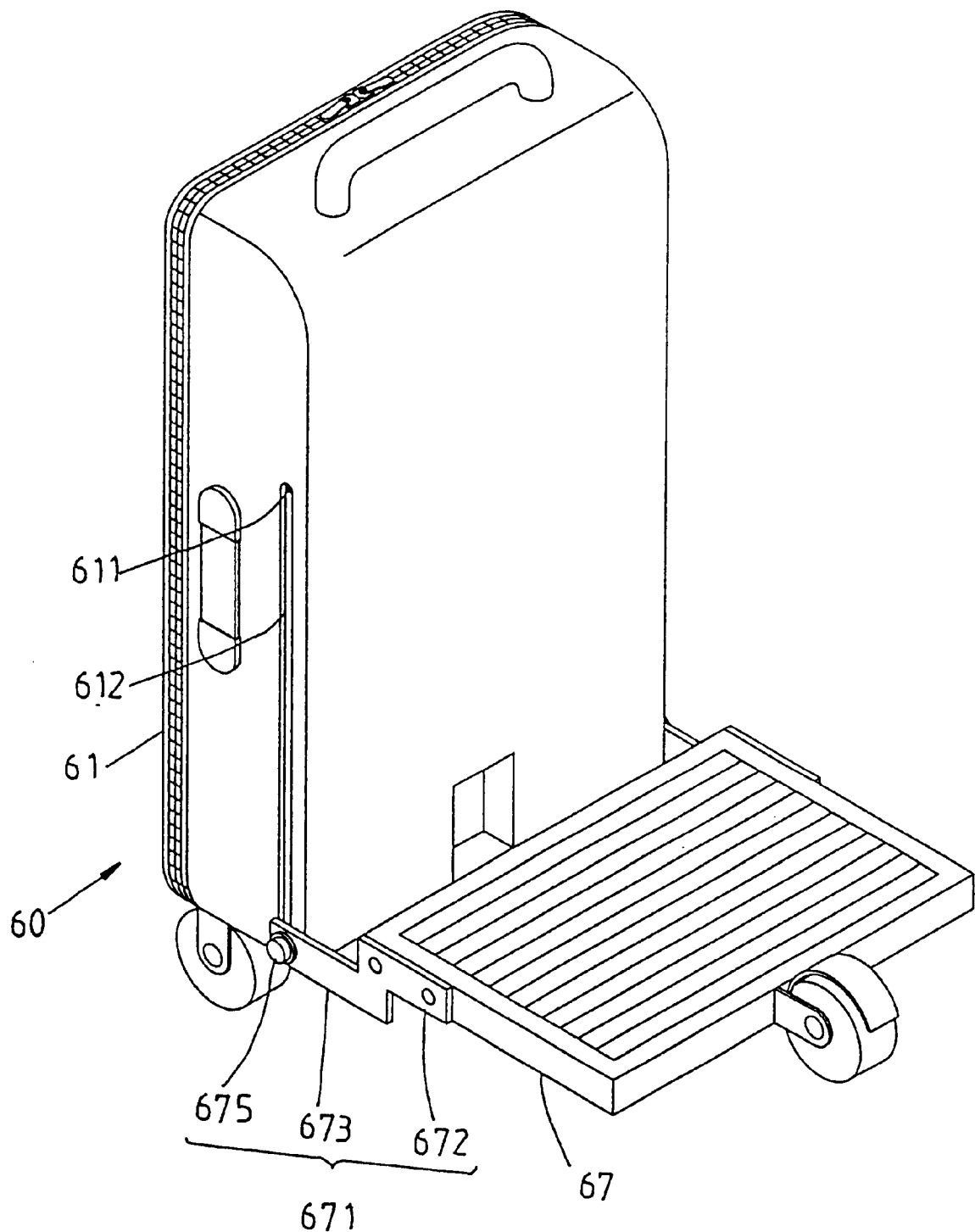
FIG. 18 shows a perspective view of the sixth preferred embodiment of the present invention.

In operation, as shown in FIG. 17 in the folded state, the fixation member 675 is engaged with the locating portion 611. In the unfolding process, as shown in FIG. 18, the fixation member 675 is loosened to slide along the guide slot 612 to the bottom and is then tightened at the lower locating portion 611. The slide board 67 is in the unfolded state for sliding.

Figure 19:
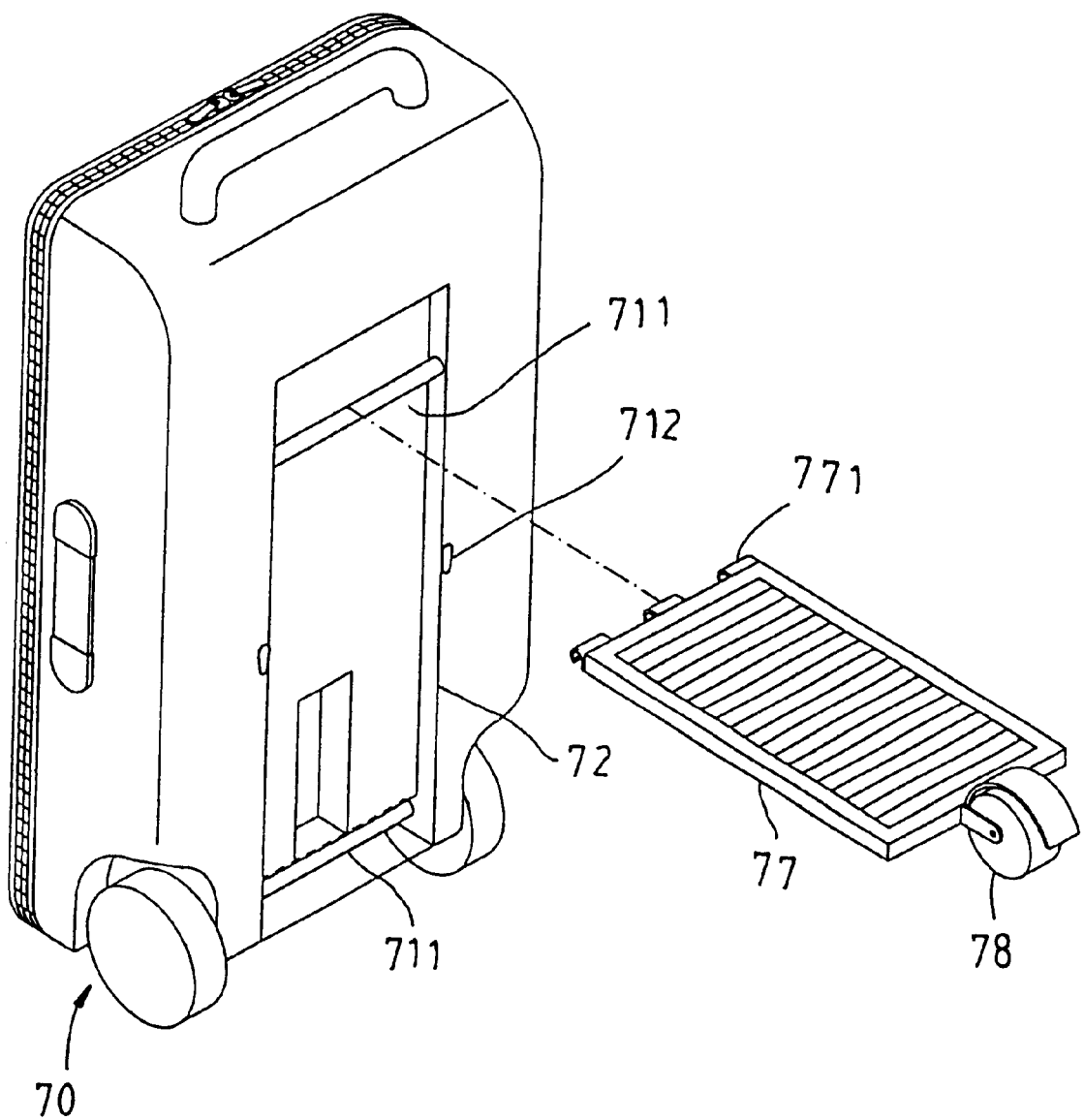
FIG. 19 shows an exploded view of a seventh preferred embodiment of the present invention.
Figure 20:
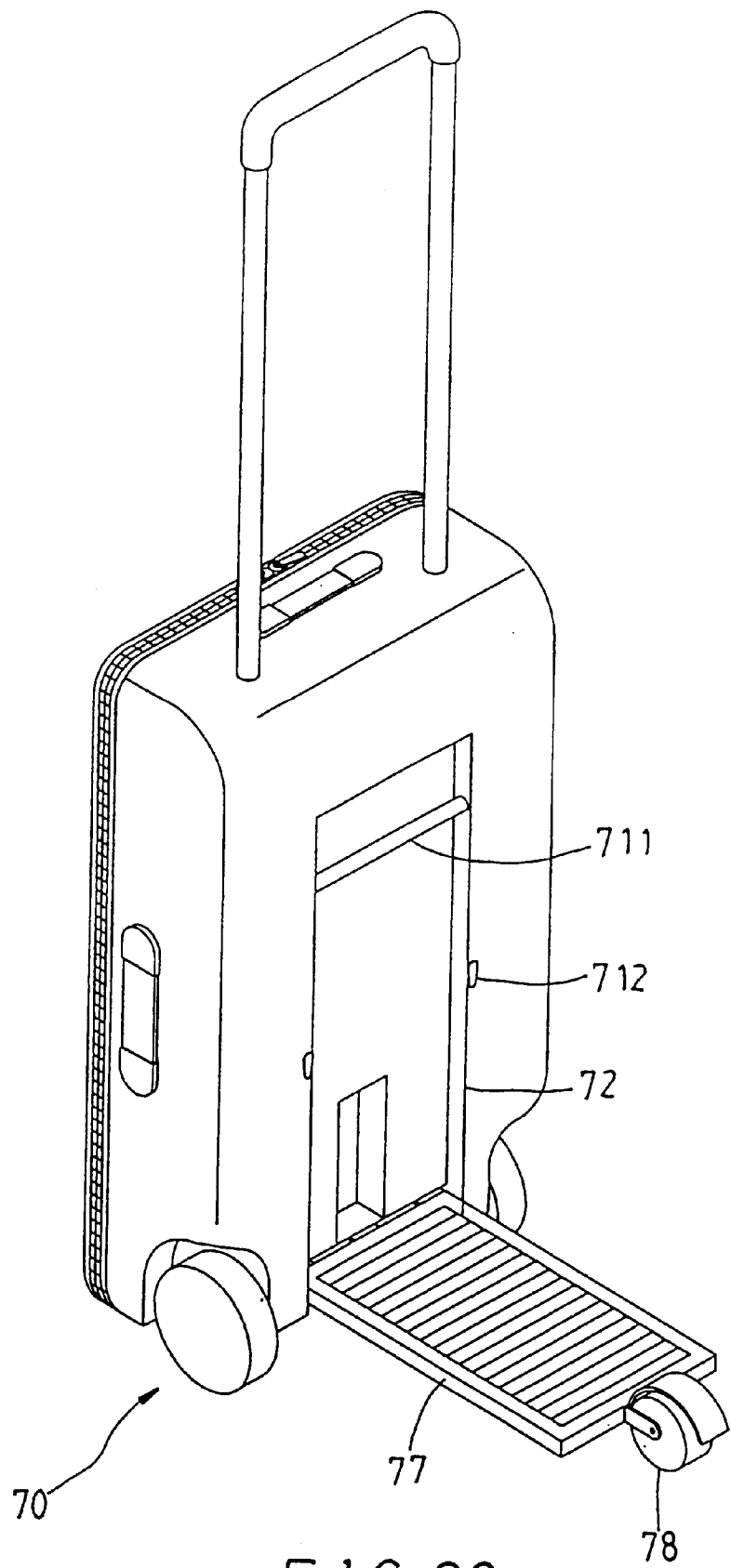
FIG. 20 shows a perspective view of the seventh preferred embodiment of the present invention in combination.

As shown in FIG. 19, a portable bag/box 70 of the seventh preferred embodiment is similar to the first embodiment except that the former comprises an article holding body 71 which is provided in the upper and the lower portions of one side thereof with a hanging portion 711, which is a round rod. This side is provided with at least one keeping member 712. The slide board 77 is provided at the front end with a hooked portion 771 for hanging on the hanging portion 711. In the folding process, the hooked portion 771 is hung on the upper hanging portion 711. The board body of the slide board 77 is received in the receiving slot 72 of the article holding body 71. The keeping member 712 is used to stop the slide board 77 to attach to the article holding body 71. In the unfolding process, as shown in FIG. 20, the hooked portion 771 is hung on the lower hanging portion 711. The board body of the slide board 77 is horizontally located such that the rear wheel 78 comes in contact with the ground surface for user to ride thereon.

Figure 21:
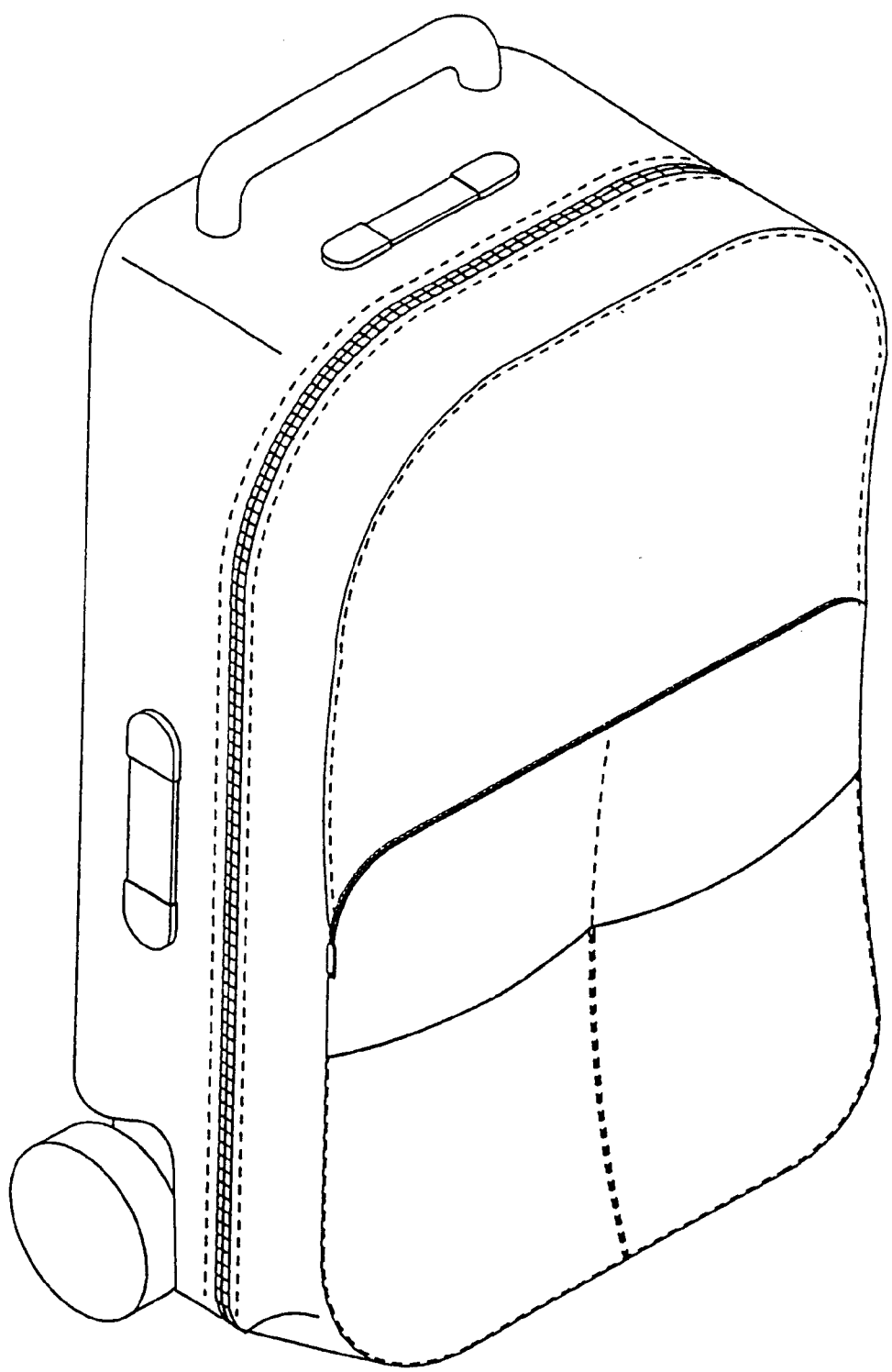
FIG. 21 shows another pattern of the article placing body of the present invention, showing the bag body which is formed of a portion made of a rigid material and a portion made of a soft material.
Figure 22:
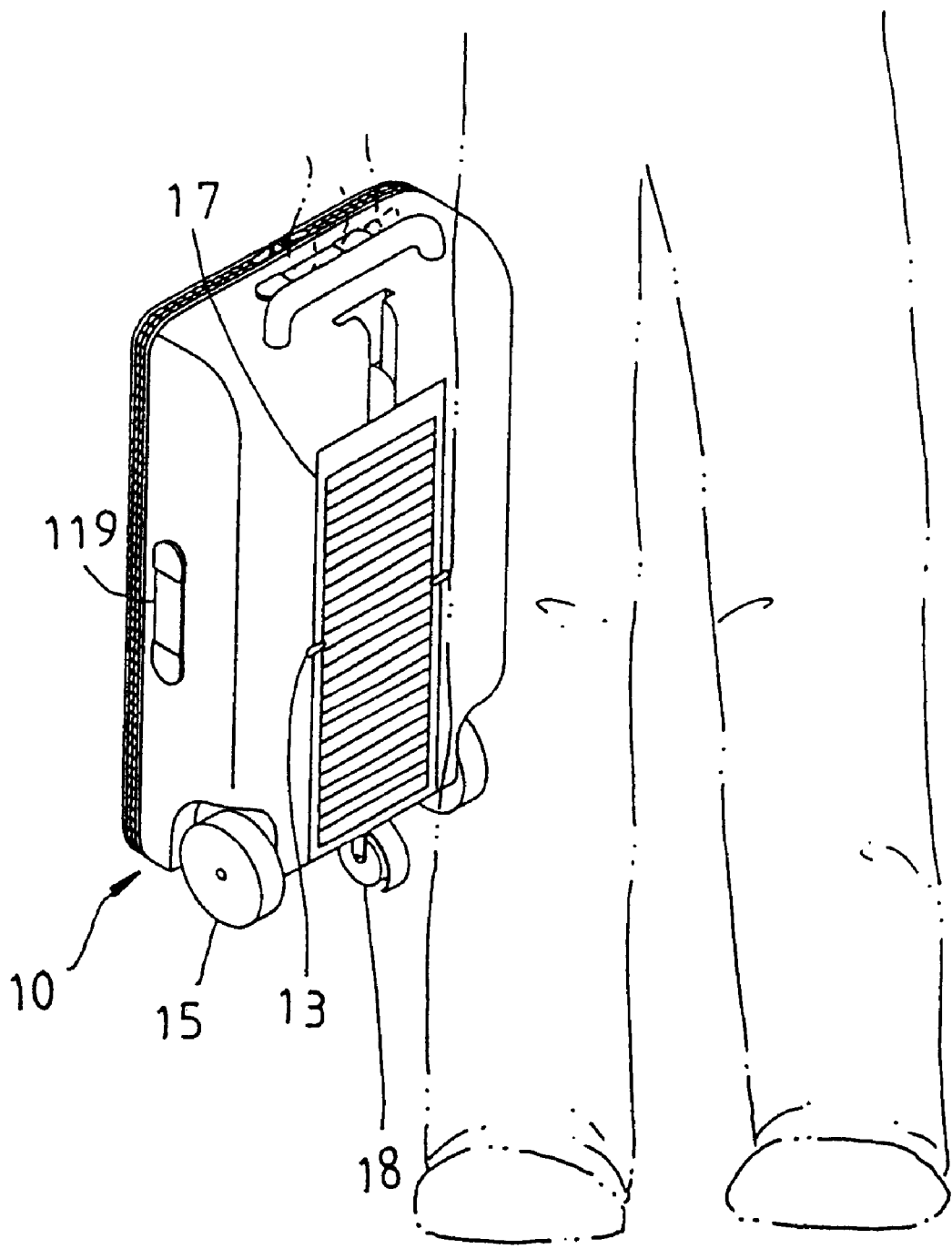
FIG. 22 shows a schematic view of the present invention in use such that the present invention is carried by hand.

The article holding body of the present invention is formed of a shell which is made of a rigid material or a portion of rigid material, a portion of soft material, as shown in FIG. 21.

The present invention does not confine the pattern of the pull rod, as shown in FIG. 13.

The wheel bodies 15 of the present invention is not confined to front two rear one, or front one rear two, may be front one rear one, or front one rear two, may be front one rear one, also may be front two rear two. The slide board is provided in the bottom with two wheel bodies. The article holding body 11 is provided in the bottom with two wheel bodies. Or the slide board is provided in the bottom with one wheel body. The article holding body 11 is provided at the bottom with one wheel body.

The present invention is portable, light in weight, quiet, no parking problem, and no exhaustion fume. The present invention can be used in place of car between the residence and the station of train, bus, rapid transit, etc.

What is claimed is:

1. A portable bag/box comprising:
    a) an article holding body having:
        i) an interior with a receiving space;
        ii) a retractable handle; and
        iii) a pivot with at least one wheel connected to the article holding body;
    b) a slide board having a rear wheel connected to a first end thereof; and
    c) a connection mechanism slidably and pivotally connecting a second end of the slide board to a back of the article holding body,
    wherein the second end of the slide board is movable between a retracted position for storage and an extended position for use, the slide board being positioned adjacent to the back of the article holding body with the second end of the slide board adjacent to a top of the connecting member in the retracted position and the slide board protruding from the article holding body with the second end of the slide board being pivotally connected to the pivot in the extended position.

2. The portable bag/box according to claim 1, further comprising a receiving slot on a back of the article holding body, the slide board being adapted to removably fit within the receiving slot of the article holding body in the retracted position.

3. The portable bag/box according to claim 1, wherein the connection mechanism includes:
    i) a rail on a back of the article holding body; and
    ii) a guide block with a recess, the guiding block connected to the second end of the slide board, the guide block being slidably mounted within the rail along the length of the rail, and the recess engaging the pivot in the extended position.

4. The portable bag/box according to claim 3, wherein the rail has an insertion slot on either side thereof, the guide block has protruded blocks extending from opposing sides thereof, the protruding blocks being slidably fit within the insertion slot of the rail.

5. The portable bag/box according to claim 1, wherein the article holding body has a plurality of keeping members, the keeping members engaging the slide board when the slide board is in the retracted position.

6. The portable bag/box according to claim 1, wherein the slide board has a supporting portion connected to a first end thereof, the supporting portion engaging the pivot in the retracted position.

7. The portable bag/box according to claim 1, wherein the rear wheel has a braking device with a brake cover engageable with the rear wheel.

* * * * *